US012164403B2

(12) United States Patent
Perryman et al.

(10) Patent No.: US 12,164,403 B2
(45) Date of Patent: Dec. 10, 2024

(54) ENVIRONMENTAL IMPACT POWER CONSUMPTION RATING FOR APPLICATIONS

(71) Applicant: Microsoft Technology Licensing, LLC, Redmond, WA (US)

(72) Inventors: Marcus Henry Perryman, Wimborne (GB); Pierre Christophe Lagarde, Colombes (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/382,239

(22) Filed: Jul. 21, 2021

(65) Prior Publication Data

US 2023/0027162 A1 Jan. 26, 2023

(51) Int. Cl.
G06F 11/30 (2006.01)
G06F 11/34 (2006.01)

(52) U.S. Cl.
CPC ................. G06F 11/3062 (2013.01)

(58) Field of Classification Search
CPC .. G06F 11/3062; G06F 1/3203; G06F 1/3428; G06F 1/302
See application file for complete search history.

(56) References Cited

U.S. PATENT DOCUMENTS 8,335,661 B1 12/2012 Satish
9,195,515 B1 * 11/2015 Butterworth .......... G06F 9/5094
2002/0069037 A1 * 6/2002 Hendrickson ......... H04L 67/125
702/186
2011/0173461 A1 * 7/2011 Felter .................... G06Q 10/10
713/300
2013/0007255 A1 * 1/2013 Gerber .................... G06F 9/54
709/224
2014/0325481 A1 * 10/2014 Pillai .................. G06F 11/3062
717/124
2015/0220127 A1 * 8/2015 Kukoyi ............... G06F 11/3062
713/340
2018/0120923 A1 * 5/2018 Srinivasan ............. G06F 1/266
2021/0216428 A1 * 7/2021 Thompson ............ G06F 1/3206

OTHER PUBLICATIONS

"International Search Report & Written Opinion issued in PCT Application No. PCT/US22/031686", Mailed Date: Aug. 18, 2022, 14 Pages.

Zhang, et al., "The Impact of User Choice on Energy Consumption", In Journal of IEEE Software, vol. 31, Issue 3, May 2014, pp. 69-75.

\* cited by examiner

Primary Examiner — Jaweed A Abbaszadeh
Assistant Examiner — Gayathri Sampath
(74) Attorney, Agent, or Firm — Barta Jones, PLLC

(57) ABSTRACT

Systems and methods for generating a power consumption rating include receiving instrumentation data corresponding to a plurality of applications. The received instrumentation data is processed to calculate a relative power consumption value for each application of the plurality of applications. The relative power consumption value for each application is compared and a power consumption rating for each application based on the comparison is generated, thereby providing a visual indicator of power consumption for the applications that can be easily evaluated.

20 Claims, 7 Drawing Sheets

ENVIRONMENTAL IMPACT POWER CONSUMPTION RATING FOR APPLICATIONS

BACKGROUND

Overall power usage by computing devices continues to increase as the number of devices, types of devices, and available applications increase. In many cases, application users and application designers are unaware of the power usage by the computing devices, particularly with respect to applications running on the computing devices. And, even if the users or developers desire to reduce power usage resulting from applications running on a device to reduce the impact on the environment, there is no way to determine the impacts from specific changes (e.g., application usage changes or application design changes). That is, users and developers are unable to determine a specific correlation between changes in usage or design with power consumption. As such, users and developers are unaware of the power consumption impacts of changes to application usage and/or design. As such, where two or more applications offer similar capabilities, there is presently no way for a user to make an informed choice between the applications based on environmental impact.

Thus, while a user or designer can turn off or disable particular applications or features of the applications, there is no way to know the environmental impact of the changes. For example, there is no way to determine the impact on power usage of changed application usage behavior, changes in application design, changes in application features, etc.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for generating a power consumption rating comprises receiving instrumentation data corresponding to a plurality of applications and processing the received instrumentation data to calculate a relative power consumption value for each application of the plurality of applications. The computerized method further comprises comparing the relative power consumption value for each application and generating a power consumption rating for each application based on the comparison.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods of various examples described herein are configured to determine the environmental impact of application usage based on power consumption by the application. In some examples, Environmental Impact Ratings (EIRs) are generated and displayed for applications running on an operating system (e.g., Windows® operating system). For example, an EIR for an application is generated by combining usage telemetry data for the central processing unit (CPU), display, and/or other system resources that the application utilizes during execution. In some examples, the EIR considers other factors, including service delivery resource costs, such as related cloud services or streaming power usage across the network, and other relevant factors. In one or more examples, the EIRs are normalized within an application category (e.g., music streaming, note taking, calculator) to provide a relative indicator that can be clearly understood by consumers or designers (e.g., EIRs can be periodically updated to encourage developers to improve resource consumption over time).

As a result of performing the operations described herein, the overall user experience can be improved by allowing users and developers to identify the environmental impact of application usage. In this manner, when a processor is programmed to perform the operations described herein, the processor is used in an unconventional way that allows for more efficient processing and power usage by applications, which results in reduced power consumption. In some examples, the herein described operations can facilitate driving consumer preference toward lower powered, lower impact applications, and facilitate driving developers to be aware of and optimize resource usage. That is, one or more examples allow for a focus on sustainability around power consumption, for example, operating platform power consumption by developers who are not aware of power consumption of applications being designed to improve sustainable software engineering; and consumers who are not aware and cannot be informed by the choice of the application with regard to environmental impact. As such, an increased awareness of the overall impact of technology on the environment can be provided, and sustainable software engineering can be more integrated with innovation, resulting in an improved user experience and/or application performance.

Figure 1:
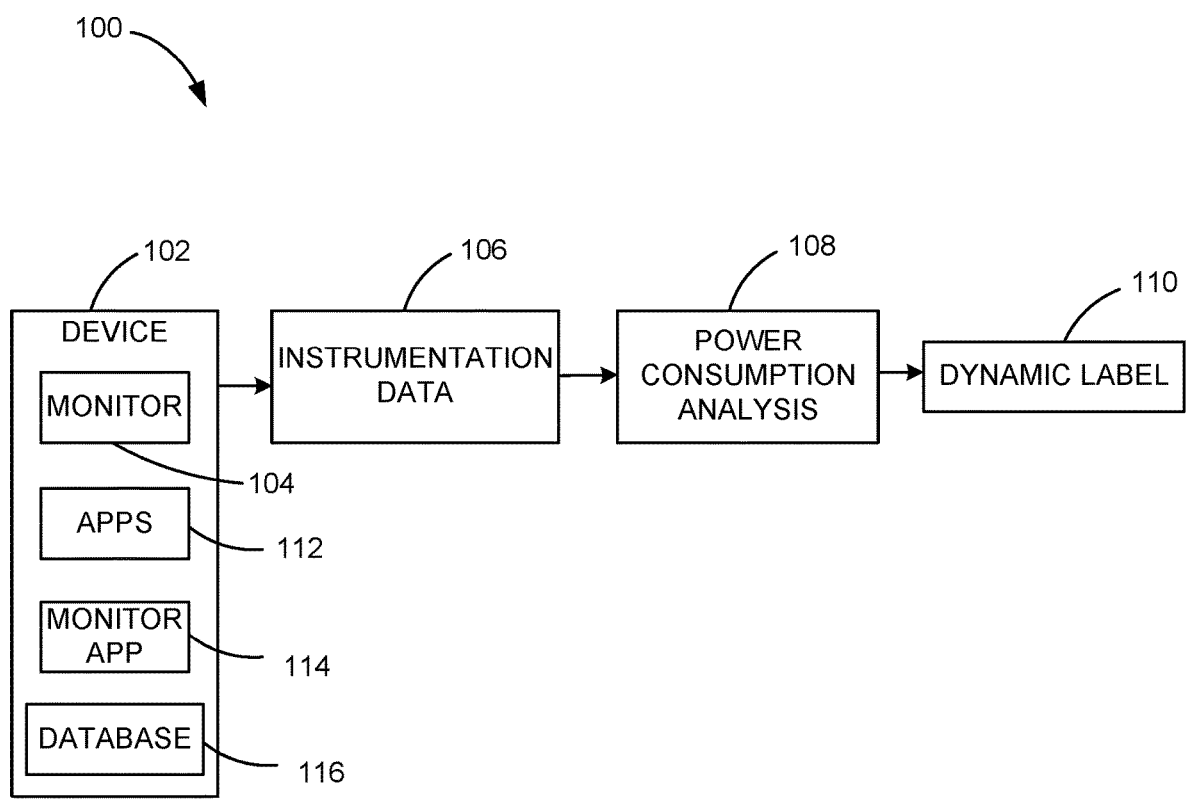
FIG. 1 is a block diagram illustrating a process flow according to an example.
Figure 2:
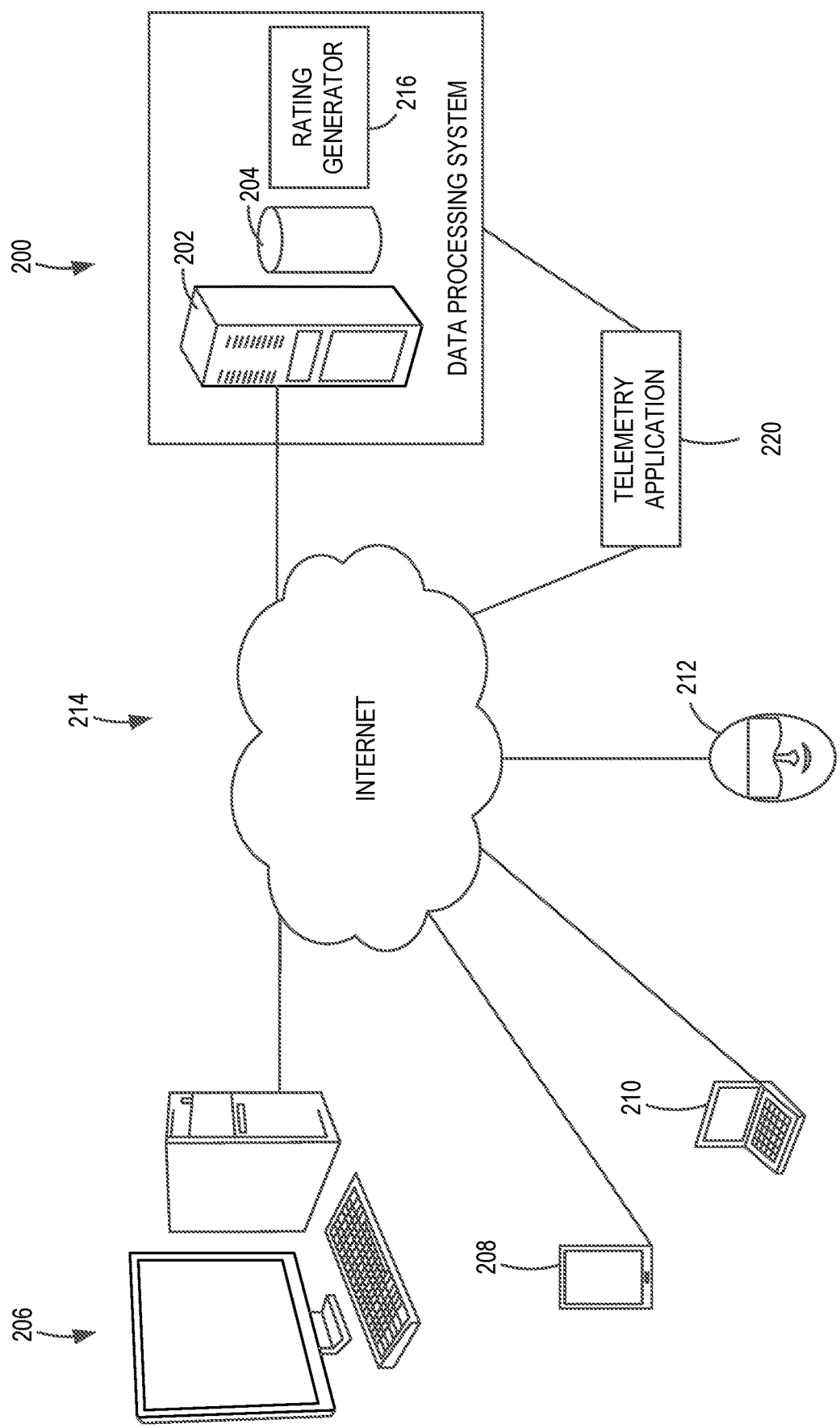
FIG. 2 is a block diagram illustrating a system according to an example.

The processes and operations described herein are not limited to a particular type of application or power usage, but can be implemented with different types of applications and to determine different impacts. The application power consumption or usage determination and/or monitoring can be implemented in a processing system 200 (e.g., application power consumption determination system) deployed as a cloud service as illustrated in FIG. 2 that performs a process flow 100 as illustrated in FIG. 1.

In various examples, the term "power" refers to the rate at which energy is consumed. Some examples may express power in energy per given unit of time. In some examples, power may be determined by instantaneous measurements or by computing the energy consumed over a period of time and dividing that value by the period of time, which can be determined from a set of instrumentation data captured by the operating system or platform (e.g., Windows® operating system). It should be appreciated that the instrumentation data that is captured is not limited to the operating system or platform. For example, cloud and service related consumption data can be collected from the provider directly (e.g., using a service application programming interface (API)) as the operating system is unable to determine and report this consumption.

While different devices may calculate energy and power in different manners, many devices that measure power consumption may use the unit Watts, and may do so by multiplying an instantaneous current measurement for direct current in Amperes and the voltage in Volts. The term "energy" may be the power integrated over time. For example, energy in Kilowatt-Hours is the average power in Watts measured over a period of time multiplied by the length of time, in this case measured in hours. It should be appreciated that other methods can be used to determine energy or power consumption, including alternating current examples that may use expressions for power factor, among others.

In some examples, power may be directly measured and energy may be estimated or calculated from multiple instantaneous measurements. In other examples, energy may be measured directly and power may be calculated. In some examples, certain components may measure or determine power directly while other components may measure or determine energy directly. In still other examples, energy or power may be measured or determined indirectly, such as measuring temperature or other parameters from which energy or power may be calculated.

The overall energy consumed by an application running on the device may be determined at least in part by summing the energy consumed by the various components used by the application when running. In some examples, the overall energy may be determined by adding the energy consumed by each individual component. In other examples, a function or other mechanism may be used to calculate overall energy used by the application and such a mechanism may include input from each of the measured energy consumed by individual components.

One or more examples provide an instrumented device capable of monitoring energy consumption by various applications. The energy consumption may be evaluated for determining a rating for the applications and/or an optimized design configuration may be determined during application design by a software developer.

The mechanisms for monitoring power or energy consumption at an application level may be used for reducing power consumption or optimizing the power consumption of one or more applications, and for selecting an efficient set of applications for operation on a device (e.g., user selection of applications to install and/or run on a device). An optimized or desired power consumption level may be determined by executing different sets of applications, and then determining an optimal configuration based on the energy consumption during operations of the applications. In some examples, a user is able to view the relative power consumption ratings of applications prior to installation and/or operation (e.g., power consumption ratings displayed in an application storefront). As such, a user is able to select an application, set of applications, and/or an application configuration with a desired or required power consumption level or rating.

A process flow 100 for calculating power consumption information to generate a dynamic label relating to the power consumption is illustrated in FIG. 1. The power consumption information can be formatted in different ways and presented to a user as described in more detail herein. It should be noted that that while the process flow 100 is illustrated in connection with a single device 102, one or more examples use information from a plurality of devices (and/or users) that can be accumulated and processed over time. As can be seen, the device 102 includes a monitor 104, which monitors power consumption or usage. In one example, the monitor 104 captures a set of power consumption data, illustrated as instrumentation data 106. In some examples, the instrumentation data 106 is captured by the operating system of the device 102 and mined by the process flow 100 to acquire or obtain data useful to determine power consumption of one or more applications 112 running on the device 102. For example, usage telemetry data is mined from the instrumentation data 106 and processed using a power consumption analysis 108. In some examples, a script, SQL query, or query performed using a D3 query tool can be used to mine the usage telemetry data from a database 116. It should be noted that although a single database 116 is shown, in some examples, the data is stored in a plurality of databases 116.

In one example, while the device 102 is executing (e.g., running one or more applications 112), the monitor 104 is configured to monitor the power or energy consumption of various components and subcomponents operating in combination with or being used by the one or more applications 112. In some examples, a monitor application 114 (which may be part of the operating system or platform) communicates with the monitor 104 to configure the monitor 104 and receive data that can be used to calculate power or energy consumption corresponding to use of the application(s) 112. For example, the monitor 104 is configured to acquire and store the instrumentation data 106 to be used for a power consumption analysis 108. That is, the monitor application 114 configures the monitor 104 to define what information is collected and when to collect the information. In one example, the monitor 104 is configured to collect data to calculate power or energy consumption information based on a subset of the available components. The monitor 104 is configured to collect information over a specific period of time, or when a specific workload performs a specific function, in some examples. In some examples, the monitor 104 stores information already being obtained by the operating system.

The monitor application 114 receives data from the monitor 104 in different manners. In some examples, the monitor 104 is configured to collect data for a specific application or operation being performed by the application and, when the operation is completed, send data to the monitor application 114. In other examples, the monitor 104 is configured to collect data and send data to the monitor application 114 at a predefined frequency or after a specific event occurs. For example, the monitor 104 can be configured to transmit collected data every five minutes, every day, etc. or can be configured to transmit collected data after a certain portion of the operation(s) has completed.

It should be noted that the monitor 104 initiates the transmission of data in some examples. In other examples, the monitor application 114 sends a request to the monitor 104 and the monitor 104 responds to the request by transmitting data. In such examples, the requests can be sent to the monitor 104 (as well as monitors of other devices).

The monitor application 114 in some examples updates the database 116 with collected information, such as the instrumentation data 106. In various examples, the data stored in the database 116 includes historical data that relates to the energy or power usage and/or consumption of the applications 112. In some examples, the database 116 is updated with a summary statistic that related to the overall energy or power usage and/or consumption of the device 102 during operation of the one or more applications 112. In some examples, the information relates to or is associated with the energy or power usage and/or consumption of specific components of the device 102 used to perform operations of the one or more applications 112 (e.g., one or more monitored components operating when the one or more applications 112 are in use).

Using the instrumentation data 106, the power consumption analysis 108 is performed to determine the power consumption or usage attributable to each of the one or more applications 112. In some examples, the power consumption analysis 108 also includes a comparison of a subset of the one or more applications 112 that can include normalizing the power consumption or usage, such as over a time period or plurality of users and/or across a group or type of applications (e.g., normalize per individual user over a range of power usage for each application 112). In one example, each of the applications 112 is categorized and normalization of the power consumption or usage is performed across each of the categories of applications 112. That is, the normalization of the power consumption or usage is separately performed for each category of applications 112. It should be noted that the categorization of the applications 112 can be performed using any category type definition (e.g., based on an application store categorization, such as categorization within the point of acquisition for the application experience or a specific Application (App) Store (such as the Windows® App Store) or other application acquisition experience). As a result, the power consumption analysis 108 can be performed to determine and compare the power consumption or usage of like applications 112.

In one or more examples, the processed power consumption or usage data, such as performed by the power consumption analysis 108 results in a dynamic label 110 for each application 112. In one example, the dynamic label 110 is an EIR for each application 112 that is based at least in part on the calculated power consumption or usage of the application 112 (e.g., average power consumption or total power consumption over a defined time period). It should be noted that the dynamic label 110 is updated over time in some examples. For example, when an update (e.g., application developer update) is provided to the application 112, power consumption analysis 108 is again performed and an updated dynamic label 110 generated. In some examples, an updated dynamic label 110 is generated after other defined time periods, such as after a number of months, after the addition of a threshold amount of new applications 112 to a category of applications 112, etc. As such, an indicator of environmental impact of each of the applications 112 can be updated periodically and reflect a relative current power consumption or usage within the category of applications 112. For example, the dynamic label 110 is representative of power consumption or usage feedback relating to the applications 112 (e.g., power consumption feedback for Windows® applications). In some examples, the label 110 can be displayed or provided to a user, such as on a product description page (PDP) for each of the applications 112 (e.g., within the Windows® Store experience and showing the power rating on a web page used to acquire the application). The dynamic label 110 (e.g., the rating of the power consumption) is periodically updated in some examples to allow individual application developers time to modify the application and drive the rating (e.g., letter or value rating) up (e.g., to improve the rating).

It should be appreciated that different types of data can be collected and, for example, stored within the database 116. For example, the monitor 104 is configured in various examples to capture certain types of data, such as: D3 telemetry data (e.g., electricity, CPU consumption, minutes used for process), network usage data (power consumption is derived from this data), display usage (e.g., foreground/background application, pixels lit by the application in foreground), disk activity, user usage of the applications 112 (e.g., daily active usage of the application 112 by the user, data minute activity usage per user), etc. As should be appreciated, other types of data can be acquired with an appropriately configured monitor 104. For example, other types of data include, without limitation: backlight (high/low) usage, screen on/off data, volume level/speaker usage, battery power reduction (e.g., power saving mode), etc. In general, the herein described systems and methods can be configured to capture and process any type of data using the power consumption analysis 108 as described in more detail herein. In one example, a Windows® application is used to collect telemetry (diagnostic) data that can be used in the power consumption analysis 108. That is, in some examples, the database 116 stores logs of the telemetry data collected by the system. The logs can then be parsed or filtered to acquire data relating to power consumption or usage data for the power consumption analysis 108 (e.g., extract metrics or data related to power consumption or usage data as described in more detail herein). In some examples, the database 116 forms part of or is embodied within an identity system within the operating system (e.g., Windows®) platform.

Thus, with the process flow 100, in some examples, instrumentation data 106 (e.g., software instrumentation data) collected from user program sessions are analyzed, including to calculate program (application) power usage or consumption metrics. Information representative of the application power usage metrics is output, such as in a form that allows for comparison between applications. It should be noted that the instrumentation data 106 in some examples can be further analyzed, such as to determine at least one of a power usage trend over time, and to determine user groups associated with the power usage.

It should also be noted that different criteria and data can be used in various examples to perform the power consumption analysis 108. That is, different parameters, criteria, data, etc. can be used to analyze the instrumentation data 106. The power consumption analysis 108 can also be performed to determine different types of data relating the power consumption by the applications 112. For example, the power consumption analysis 108 can be performed to determine power consumption profiles for the applications 112 that correlate power consumption to computing system activity of the device 102 when the applications 112 are running (e.g., performing operations or in an idle state).

With particular reference to FIG. 2 (and continued reference to FIG. 1), the processing system 200 determines power consumption by the individual applications 112 and can generate a rating (e.g., the dynamic label 110) for one or more of the applications 112 based on the determined power consumption (e.g., a comparative rating of applications across an application type). The processing system 200 includes one or more computers 202 and storage 204 to store, for example, collected power consumption or usage data as described in more detail herein. It should be appreciated that other data can be stored in the storage 204 and processed by the one or more computers 202 using various examples described herein. For example, different types of usage data for the device 102 (e.g., session data) can also be used to generate the rating.

The processing system 200 is connected to one or more end user computing devices 102 in some examples, such as a desktop computer 206, a smart phone 208, a laptop computer 210, and an augmented reality head worn computer 212 (e.g., Microsoft HoloLens®), each of which are capable of operating one or more of the applications 112. In the illustrated examples, the data processing system 200 is shown as connected to the end user computing devices via a computer network 214, illustrated as the Internet.

The processing system 200 receives input data, such as the instrumentation data 106 from an end user computing device or server, or from a telemetry application 120. The data is uploaded to the processing system 200 for processing, such as for processing using the process flow 100 to determine relative power consumption or usage among the applications 112. It should be noted that in some examples, the processing system 200 performs data analytics on the received instrumentation data 106, which is normalized per user and may be used to generate one or more graphs (e.g., scripts may be implemented to generate one or more power consumption graphs representative of a power consumption profile). Thus, a framework to compare the power consumption or usage of applications 112 is thereby provided.

It should be appreciated that some or all of the processing system 200 or the functionality of the processing system 200 can be implemented within one or more of the end user computing devices.

The processing system 200 in this example also implements a rating generator 216 that performs rating generation based on the power consumption analysis. For example, the rating generator 216 generates a power consumption rating for one or more of the applications 112, which can be based on data normalized using different criteria. In some examples, the power consumption analysis 108 generates comparative or relative power consumption data across a plurality of applications 112, which is then normalized and used by the rating generator 216 to generate a rating for each of the applications 112. For example, the analyzed power consumption data can be normalized over a period of time to account for variations in the power data ("ups" and "downs") and/or over a plurality of users.

In some examples, the functionality of the processing system 200 described herein is performed, at least in part, by one or more hardware logic components. For example, and without limitation, illustrative types of hardware logic components that are used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 3:
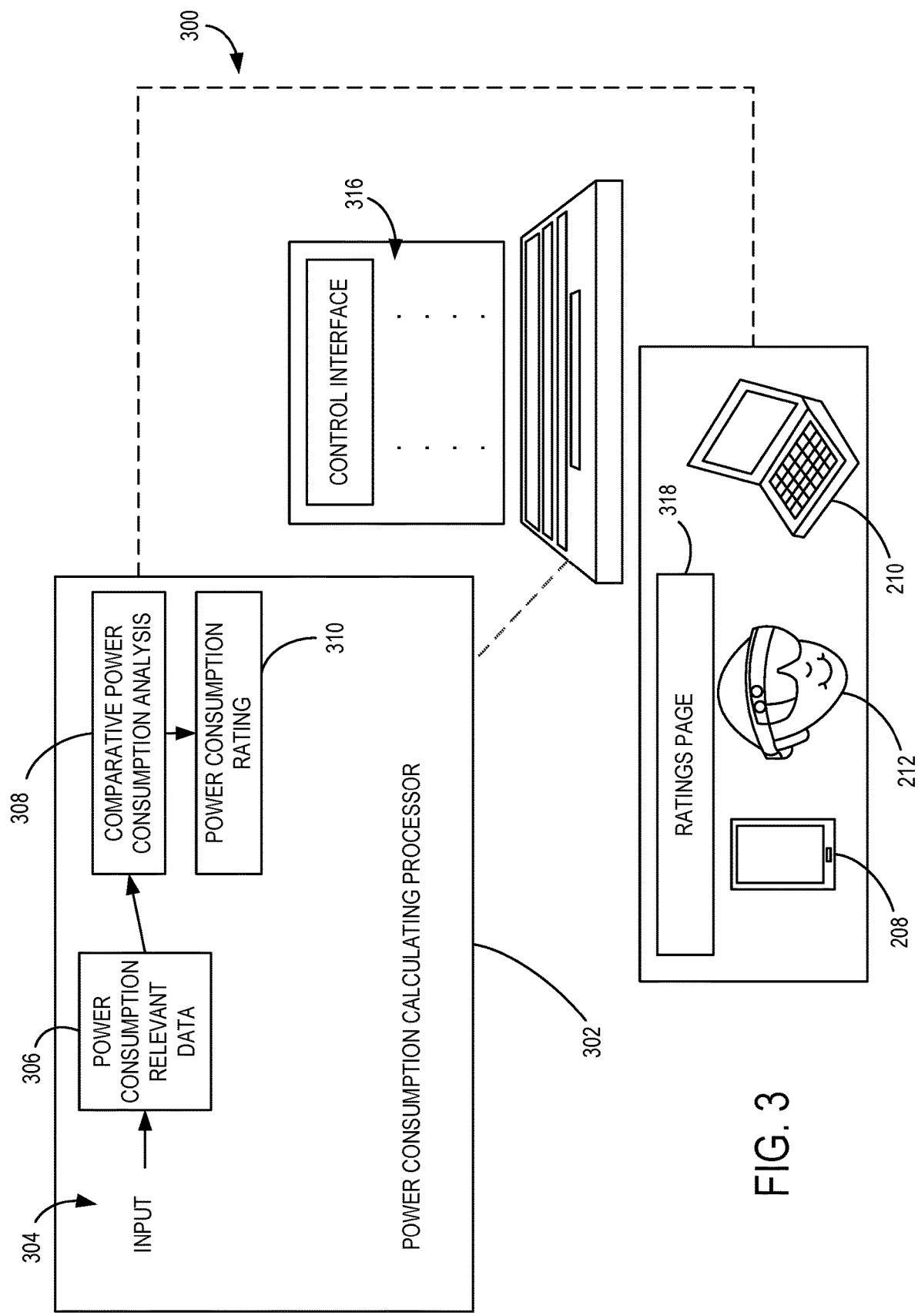
FIG. 3 is a block diagram illustrating a power consumption rating generation system according to an example.

Thus, with the present disclosure, environmental impact rating is performed, such as using a power consumption rating generation system 300 as illustrated in FIG. 3. The power consumption rating generation system 300 in one example uses a comparative power consumption analysis 308 to generate as an output, a power consumption rating 310 for each of a plurality of applications (e.g., the applications 112). More particularly, the power consumption rating generation system 300 includes a power consumption calculating processor 302 that is configured in some examples as a processing engine that performs the comparative power consumption analysis 308 of an input 304, which in some examples is the instrumentation data 106. That is, the power consumption rating generation system 300 receives the input 304 and identifies power consumption relevant data 306 to be processed by the comparative power consumption analysis 308. For example, instrumentation data relevant or related to power consumption by one or more applications is processed using the comparative power consumption analysis 308 to determine a scaled comparison of the power consumption or usage between the applications (e.g., a comparison of normalized instrumentation data as described herein). Based on this scaled comparison, the power consumption rating 310 is generated, which can be a rating for each applications within a defined application type as described in more detail herein.

Figure 4:
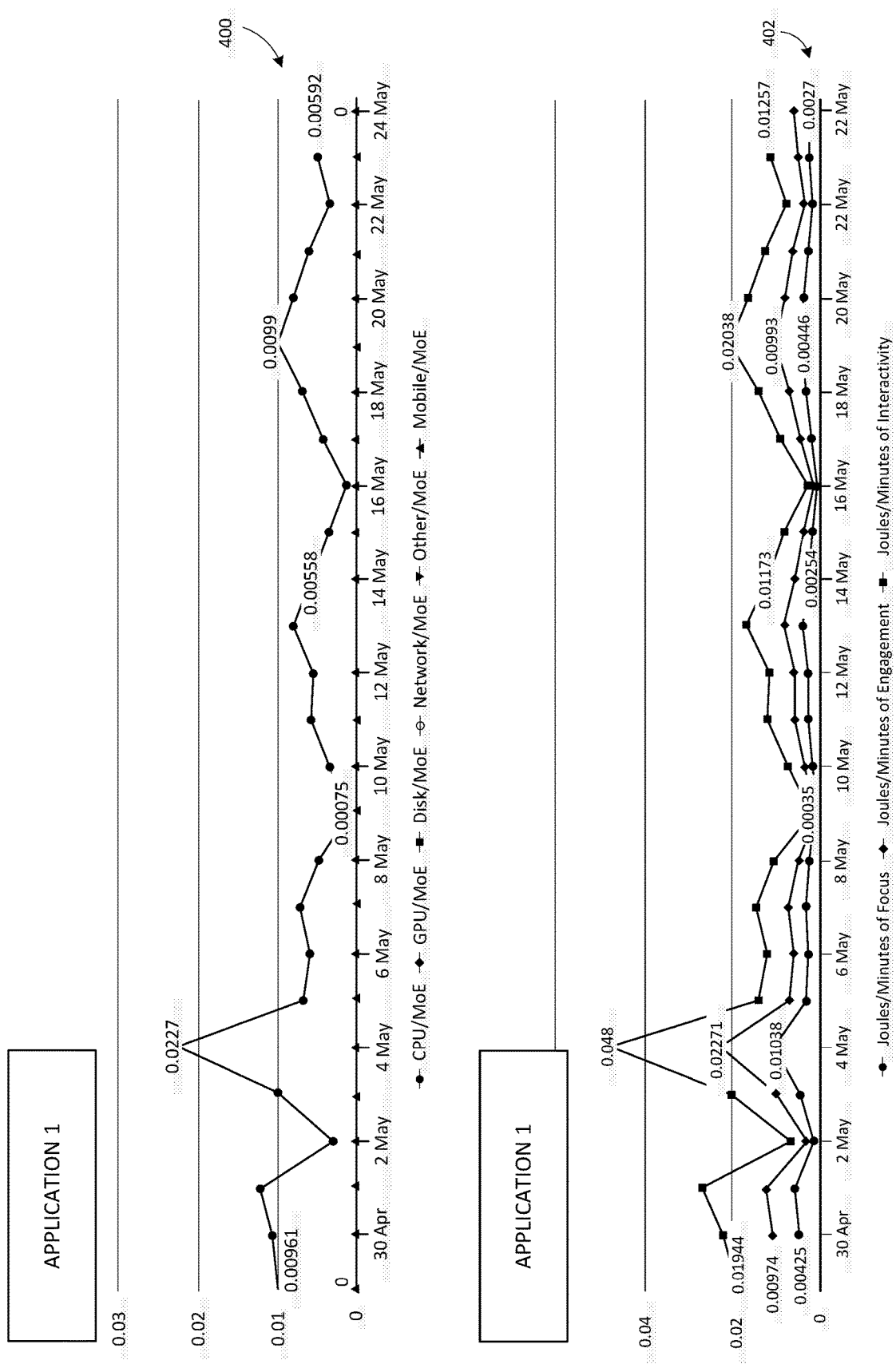
FIG. 4 illustrates graphs showing application power consumption according to an example.

The power consumption calculating processor 302 in various examples analyzes the power consumed by a computing device caused by execution of one or more applications by the computing device. In some examples, a power consumption trace or graph is generated that corresponds to the power consumption or usage of the application(s) over time. That is, an analysis over time of the amount of power that is consumed by one or more components of the computing device caused by an application executed by the processing unit of the computing device is performed and used to generate the power consumption rating 310. For example, the graphs 400 and 402 in FIG. 4 illustrate power consumption by an application over time. The graph 400 illustrates average application usage over time and the graph 402 illustrates corresponding average power usage over time. As can be seen, with telemetry data, such as the instrumentation data 106, a power consumption profile can be generated for one or more applications (illustrated as a single application in FIG. 4).

With the data illustrated in FIG. 4, power consumption or usage for the application can be calculated and normalized over time for comparison with the power consumption or usage of other applications. In one example, the power consumption data over time is summed (e.g., sum the power consumed by the CPU over the time period when running Application 1). The sum is then divided by the number of active minutes or number of active users to obtain a normalized value. As a result, an application instance minutes determination can be performed (e.g., Application 1 for one minute will consume X # of Joules). With this data for each of a plurality of applications, a consumable value, such as the power consumption rating 310, is generated and periodically updated (e.g. updated every three to six months).

In one example, an EIR is generated for an application run on an operating system (e.g., Windows®) by combining usage telemetry data for CPU, display usage and other components of the system that the application exercises during execution thereof. This rating is normalized within each application category in some examples (e.g., music streaming, note taking, calculator) to provide a letter (e.g., A-G) or other relative indicator that can be clearly understood by consumers and facilitate driving behaviors, such as to lower powered, lower impact applications, and drive developers to be aware and optimize resource usage. For example, the EIR can be periodically updated to encourage developers to improve resource consumption.

Figure 5:
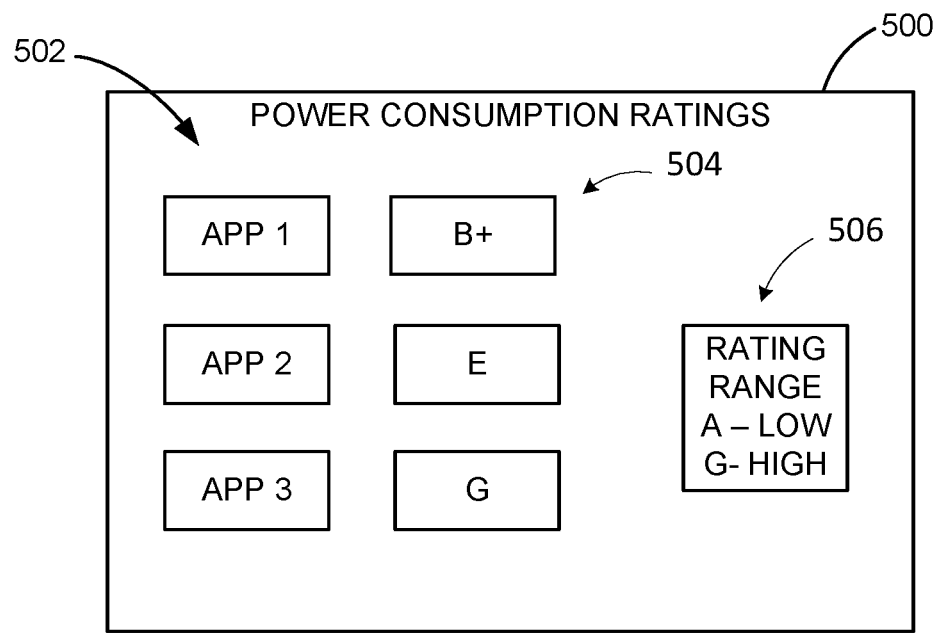
FIG. 5 illustrates a display of power consumption ratings according to an example.

Thus, using telemetry data for both system and application usage, a relative power consumption value is generated in various examples. In some examples, the relative value provides a comparison between applications of a similar type, which is published for user consumption. For example, a PDP 500 is shown in FIG. 5 and illustrates ratings 504 corresponding to each of a plurality of applications 502. That is, a relative power consumption rating 504 generated for each of the applications 502 using one or more examples described herein is provided to a user. The range or scale of the rating is identified by a rating range 506. In this example, the rating range 506 is defined by letters with A being the lowest rating (consumes the most relative amount of power) and G being the highest or best rating (consumes the least relative amount of power), or vice versa. Each of the rating levels can be defined as desired and can include sub-levels (such as a plus or minus for each letter). In some examples, each letter rating corresponds to a power consumption usage range as determined by the herein described examples. For example, each letter is defined by an upper power consumption value and a lower power consumption value corresponding to a normalized value for each of the applications 502. It should be appreciated that any indicator of relative power consumption usage can be employed for the rating scale, such as numbers, graphics, etc.

In one example, and with reference again to FIG. 3, the power consumption calculating processor 302 generates power consumption ratings 310 that are displayed or caused to be displayed on a ratings page 318 or other user viewable display. The ratings page 318 in some examples is configured similar to the PDP 500 and allows a user to view the power consumption rating for one or more applications, such as a within a particular application type or class.

Also, with respect to the power consumption calculating processor 302, various parameters, etc. can be specified by an operator for defining the analysis to be performed, etc. For example, the operator is able to specify date ranges, thresholds, etc. using a graphical user interface 316. Once the operator has configured one or more parameters, the power consumption calculating processor 302 is configured to perform power consumption analysis of a plurality of applications as described herein. It should be noted that in some examples, the ratings page 318 is stored and loaded to one or more devices, or to one or more application locations, such as an application store. The application store may include applications for use with one or more operating platforms or systems, such as the Windows® operating system or the Android operating system. The applications may also be configured to operate on different devices, such as, mobile phones, computers, gaming systems, etc.

As should be appreciated, the various examples can be used to calculate power consumption usage and ratings for different types of applications. Additionally, the various examples can be used to perform power consumption analysis using different types of data.

Figure 6:
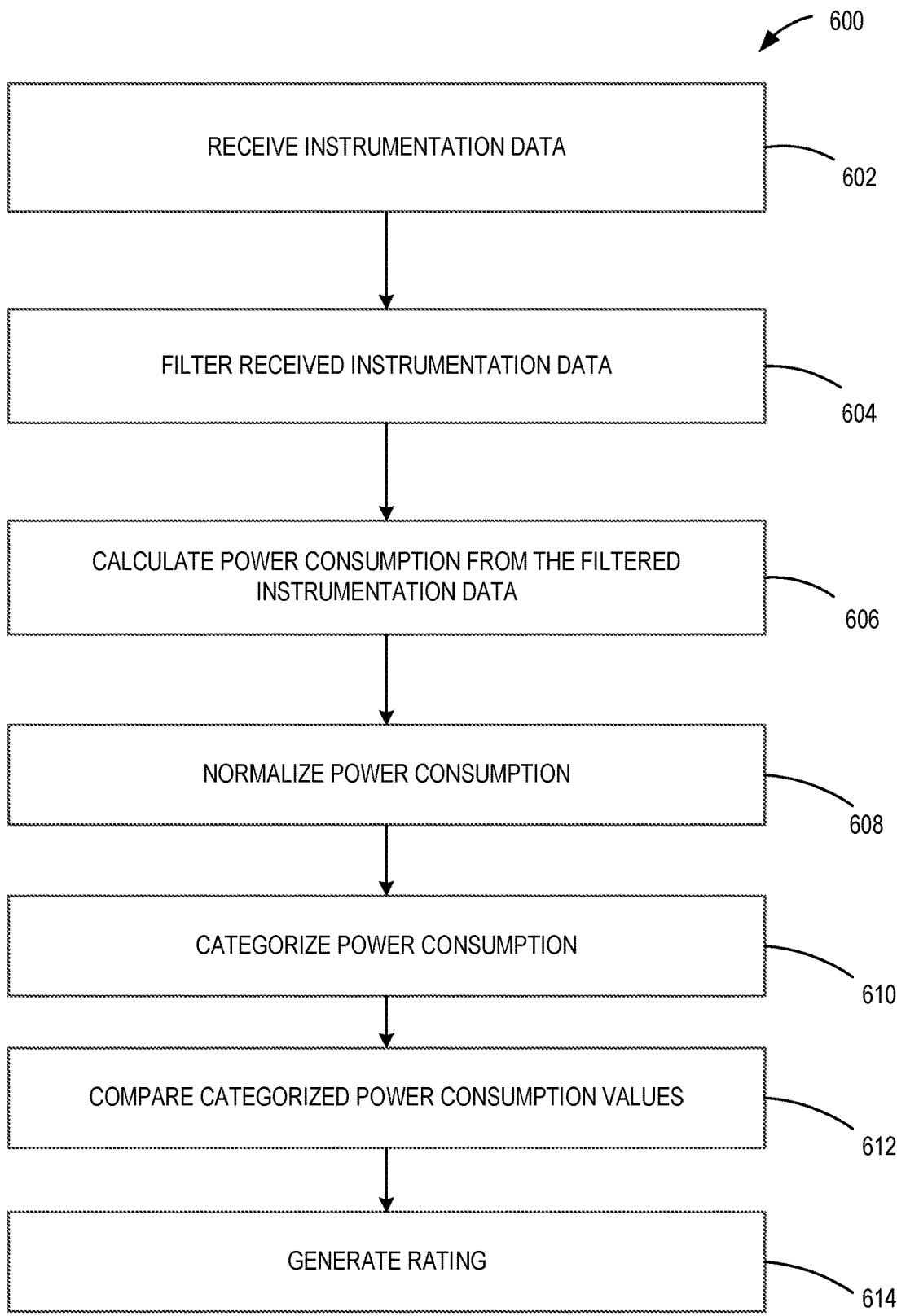
FIG. 6 is a flow chart illustrating operations of a computing device to perform application power consumption analysis according to an example.

FIG. 6 illustrates a flow chart of a method 600 for performing application power consumption analysis of various examples that can be used to generate a power consumption rating. The operations illustrated in the flow chart described herein can be performed in a different order than is shown, can include additional or fewer steps, and can be modified as desired or needed. Additionally, one or more operations can be performed simultaneously, concurrently, or sequentially. The method 600 is performed in some examples on computing devices, such as a server or computer having processing capabilities to efficiently perform the operations.

With reference to the method 600, a computing device receives a set of instrumentation data relating to an application at 602. For example, telemetry data, network usage data, display usage data, disk activity data, application usage data, etc. for the application is acquired. This data is acquired for application usage over a defined time period. It should be noted that some of this data is acquired during the normal operation of the application on an operating platform, such as for separate use also in diagnostic operations (e.g., data acquired for analysis other than for power consumption). That is, the data is already available within the system. However, in other examples, one or more monitor devices or processes (e.g., the monitor 104) are configured to acquire some or all of the instrumentation data.

The received instrumentation data is filtered at 604. For example, the instrumentation data is filtered to acquire or obtain a subset of the instrumentation data that is used to determine power consumption usage for the application. That is, instrumentation data relevant to or related to the calculations used to analyze the power consumption of the application is maintained or output for processing, such as by the power consumption calculating processor 302 (of FIG. 3). In some examples, the filtering is a data mining process that identifies only certain instrumentation data acquired by the system for use in the power consumption usage processing as described herein. It should be noted that the subset of the instrumentation data in various examples may be directly related to power consumption (e.g., power consumption value for a component used by an application) or indirectly related to power consumption (e.g., usage value for a component from which a corresponding power consumption value can be calculated). For example, telemetry data and display usage data have a direct correlation or value with respect to power consumption. Network usage data has an indirect correlation to power usage and is used to derive an associated power consumption, such as based on the components operating during the network usage time as caused by the running of the application.

The filtered instrumentation data is used to calculate power consumption or usage for the application at 606. For example, a total usage, average usage, and/or other usage over a defined time period is calculated for processes and/or components operating in response to the running of the application. That is, the corresponding instrumentation data for processes and/or components identified to be operations when the application is running are summed in some examples. In this way, a total power consumption usage of corresponding device resources is determined for the application. The calculation can be performed over varying time frames or windows as desired.

The power consumption for the application is normalized at 608. For example, the calculated power consumption (e.g., indirect and direct power usage data caused by the running of the application) by the application is normalized. In the various examples, any suitable mathematical normalization process can be used. In one or more examples, normalization can be performed across one or more of a time period, over a plurality of users, over specific application types, over specific component usage, etc. That is, in some examples, depending to the comparison to be performed and the respective power consumption rating to be generated, different normalizations of the filtered instrumentation data can be performed.

The results of the normalized power consumption are categorized at 610. For example, a plurality of application types is defined and the normalized power consumption for the application is associated with the corresponding application type for the application. The application types can be defined at any level of granularity, which in some examples is based at least in part on an application type as defined in an application store. It should be appreciated that the categorization defines a subset of normalized power consumption that will be used to generate a rating in some examples.

The categorized power consumption values are compared at 612. That is, power consumption or usage by applications within a single application type are compared. In some examples, the comparison is used to define power consumption levels or thresholds for different ratings. For example, a normal distribution (e.g., bell curve graph distribution) or other data value distribution scheme is used to rank or distinguish between different levels or ranges of power consumption with the application type.

A rating based on power consumption is then generated at 614. For example, cutoff levels or threshold levels based on the defined distribution may be used to select rating ranges or levels for a rating scheme. In some examples, the rating levels or ranges are set based on absolute values of the calculated power consumption for each application, a number of applications to be included within each rating level or range, etc. That is, the rating scheme can be varied based on a particular operating environment, a desired change in operation or design behavior with respect to power usage, etc. The rating for each of the applications can then be made available, such as for display on a PDP (e.g., within the Windows® Store experience). It should be noted that different rating or ranking schemes can be used, and can be any relative value corresponding to the calculated power consumption or usage. It should also be noted that ratings are updated periodically in some examples as described in more detail herein.

With respect to an example within a Windows® operating environment, data arrives at an existing telemetry component of the Windows® operating system, which is stored in several disparate databases. A SQL query is performed against that data, and a normalization applied over a number of data points across a threshold period of time and a threshold number of different users to create a power consumption value for an application. In some examples, the power consumption value is an averaged number (see graphs 400 and 402 FIG. 4). The power consumption values are used to generate rating values.

Thus, in some examples, the method 600 can be used to calculate the power consumption or usage of applications and generate a rating for the applications based on the calculated power consumption or usage. As such, a consumer or programmer is easily able to identify applications using less power than other applications.

Exemplary Operating Environment

Figure 7:
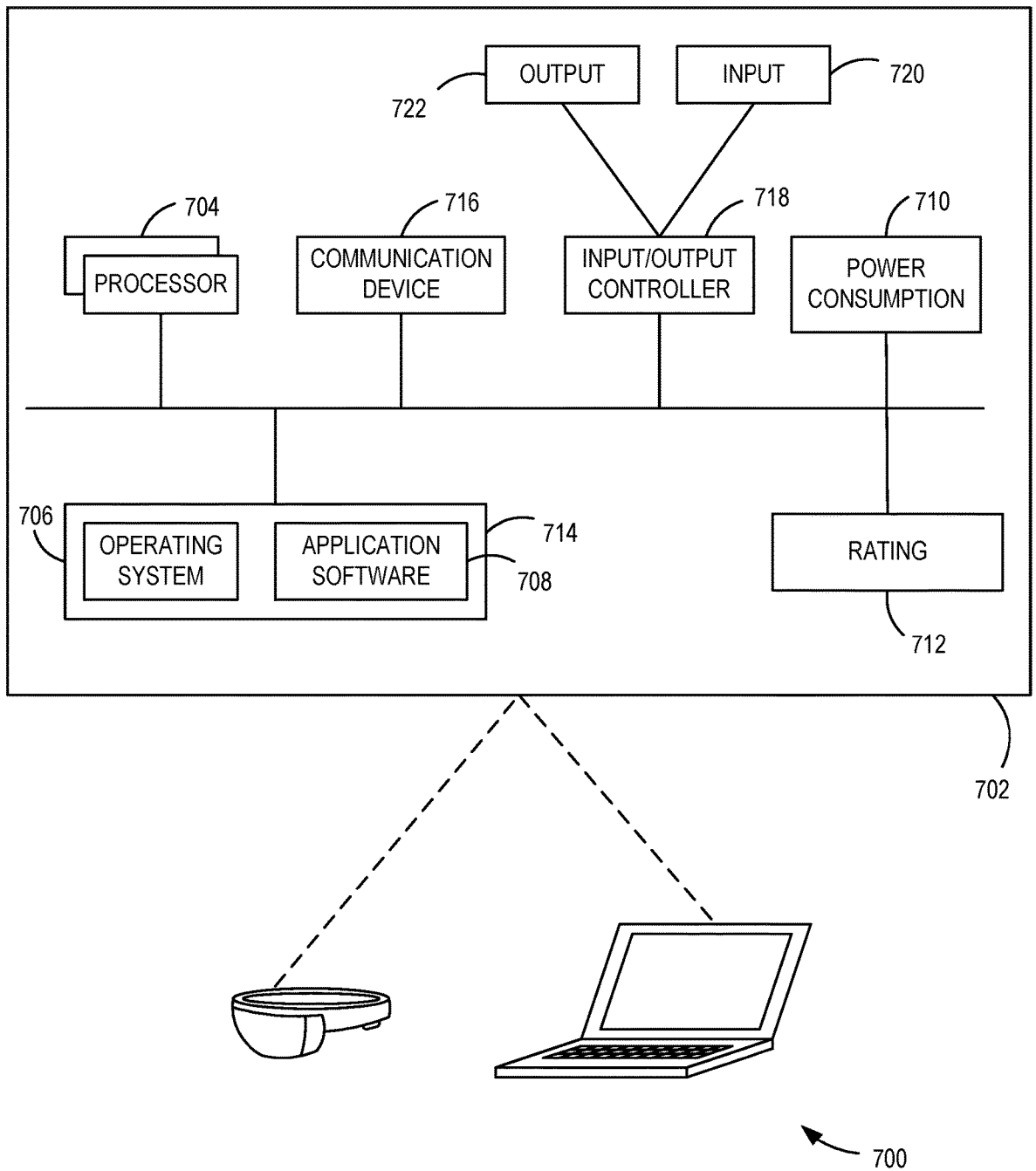
FIG. 7 illustrates a computing apparatus according to example as a functional block diagram.

The present disclosure is operable with a computing apparatus 702 according to an example as a functional block diagram 700 in FIG. 7. In one example, components of the computing apparatus 702 may be implemented as a part of an electronic device according to one or more examples described in this specification. The computing apparatus 702 comprises one or more processors 704 which may be microprocessors, controllers, or any other suitable type of processors for processing computer executable instructions to control the operation of the electronic device. Platform software comprising an operating system 706 or any other suitable platform software may be provided on the apparatus 702 to enable application software 708 to be executed on the device. According to an example, calculated application power consumption 710 used to generate a rating 712 can be accomplished by software.

Computer executable instructions may be provided using any computer-readable media that are accessible by the computing apparatus 702. Computer-readable media may include, for example, computer storage media such as a memory 714 and communications media. Computer storage media, such as the memory 714, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 714) is shown within the computing apparatus 702, it will be appreciated by a person skilled in the art, that the storage may be distributed or located remotely and accessed via a network or other communication link (e.g. using a communication interface 716).

The computing apparatus 702 may comprise an input/output controller 718 configured to output information to one or more input devices 720 and output devices 722, for example a display or a speaker, which may be separate from or integral to the electronic device. The input/output controller 718 may also be configured to receive and process an input from the one or more input devices 720, for example, a keyboard, a microphone, or a touchpad. In one embodiment, the output device 722 may also act as the input device 720. An example of such a device may be a touch sensitive display. The input/output controller 718 may also output data to devices other than the output device 722, e.g. a locally connected printing device. In some embodiments, a user may provide input to the input device(s) 720 and/or receive output from the output device(s) 722.

In some examples, the computing apparatus 702 detects voice input, user gestures or other user actions and provides a natural user interface (NUI). This user input may be used to author electronic ink, view content, select ink controls, play videos with electronic ink overlays and for other purposes. The input/output controller 718 outputs data to devices other than a display device in some examples, e.g. a locally connected printing device.

The functionality described herein can be performed, at least in part, by one or more hardware logic components. According to an embodiment, the computing apparatus 802 is configured by the program code when executed by the processor(s) 704 to execute the examples and implementation of the operations and functionality described. Alternatively, or in addition, the functionality described herein can be performed, at least in part, by one or more hardware logic components. For example, and without limitation, illustrative types of hardware logic components that can be used include FPGAs, ASICs, ASSPs, SOCs, CPLDs, and GPUs.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Other examples include:

A computerized method for generating a power consumption rating, the computerized method comprising:
  receiving instrumentation data corresponding to a plurality of applications;
  processing the received instrumentation data to calculate a relative power consumption value for each application of the plurality of applications;
  comparing the relative power consumption value for each application; and
  generating a power consumption rating for each application based on the comparison.

Other examples include:

A system for generating a power consumption rating, the system comprising:
  at least one processor; and
  at least one memory comprising computer program code, the at least one memory and the computer program code configured to, with the at least one processor, cause the at least one processor to:
    receive instrumentation data corresponding to a plurality of applications;
    process the received instrumentation data to calculate a relative power consumption value for each application of the plurality of applications;
    compare the relative power consumption value for each application; and
    generate a power consumption rating for each application based on the comparison.

Other examples include:

One or more computer storage media having computer-executable instructions for generating a power consumption rating that, upon execution by a processor, cause the processor to at least:
  receive instrumentation data corresponding to a plurality of applications;
  process the received instrumentation data to calculate a relative power consumption value for each application of the plurality of applications;
  compare the relative power consumption value for each application; and
  generate a power consumption rating for each application based on the comparison.

Alternatively, or in addition to the examples described above, examples include any combination of the following:
  categorizing each application of the plurality of applications into one or more categories of a plurality of categories and performing the comparing only within each category.
  normalizing the relative power consumption values, the normalizing performed over at least one of a defined time period and a plurality of users.
  periodically performing the generation of the power consumption rating to generate an updated power consumption rating for at least one of the applications.
  displaying the power consumption ratings to a user, wherein the user is one of a consumer or a software developer.
  wherein processing the received instrumentation data to calculate a relative power consumption value comprises at least one of summing and averaging received instrumentation data.
  wherein the instrumentation data comprises at least one of telemetry data, network usage data, display usage data, disk activity data, and application usage data.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The examples illustrated and described herein as well as examples not specifically described herein but within the scope of aspects of the claims constitute exemplary means for training a neural network. The illustrated one or more processors 1004 together with the computer program code stored in memory 1014 constitute exemplary processing means for fusing multimodal data.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method, comprising:
   executing a plurality of applications on a first device;
   obtaining, using a processor configured to monitor power consumption by each application of the plurality of applications, instrumentation data related to the power consumption by the plurality of applications;
   filtering the obtained instrumentation data to acquire a subset of instrumentation data that is directly related to the power consumption or indirectly related to the power consumption;
   calculating, based on the acquired subset of the obtained instrumentation data, a relative power consumption value for each application of the plurality of applications;
   normalizing the relative power consumption value for each application within an application category;
   dynamically generating a power consumption rating for each application based on the normalization, while the first device is executing the plurality of applications;
   generating a dynamic label for each application corresponding to the dynamically generated power consumption rating;
   presenting the dynamic label for each application of the plurality of applications to a user;
   updating the dynamic label when an application of the plurality of applications executing on the first device is updated or when a threshold amount of new applications is executed on the first device;

receiving, from the user based on the updated dynamic label for the plurality of applications, a selection of an application of the plurality of applications representing an optimized application having a desired power consumption level; and executing the selected application of the plurality of applications on a second device.

2. The computerized method of claim 1, further comprising:

categorizing each application of the plurality of applications into one or more categories of a plurality of categories; and performing the normalizing only within each category.

3. The computerized method of claim 1, wherein normalizing the relative power consumption values normalizes the relative power consumption values over a defined time period.

4. The computerized method of claim 1, further comprising periodically performing the generation of the power consumption rating to generate an updated power consumption rating for at least one of the applications.

5. The computerized method of claim 1, further comprising:

installing the selected application of the plurality of applications on the second device.

6. The computerized method of claim 1, wherein calculating the relative power consumption value for each application comprises at least one of summing and averaging the obtained instrumentation data.

7. The computerized method of claim 1, wherein:

the instrumentation data comprises at least one of telemetry data, network usage data, display usage data, disk activity data, and application usage data;

the obtained instrumentation data directly related to power consumption includes telemetry data and display usage data; and the obtained instrumentation data indirectly related to power consumption includes network usage data.

8. A system, comprising:

a processor; and a memory comprising computer program code, the memory and the computer program code configured to, with the processor, cause the processor to:

execute a plurality of applications on a device;

obtain instrumentation data related to power consumption by each application of the plurality of applications;

filter the obtained instrumentation data to acquire a subset of instrumentation data that is directly related to the power consumption or indirectly related to the power consumption;

calculate, based on the acquired subset of the obtained instrumentation data, a relative power consumption value for each application of the plurality of applications;

normalize the relative power consumption value for each application within an application category;

dynamically generate a power consumption rating for each application based on the normalization, while the device is executing the plurality of applications;

generate a dynamic label for each application corresponding to the dynamically generated power consumption rating;

present the dynamic label for each application of the plurality of applications to a user;

update the dynamic label when an application of the plurality of applications executing on the device is updated or when a threshold amount of new applications is executed on the device;

receive, from the user based on the updated dynamic label for the plurality of applications, a selection of an application of the plurality of applications representing an optimized application having a desired power consumption level; and execute the selected application of the plurality of applications on the device.

9. The system of claim 8, wherein the memory and the computer program code are configured to, with the processor, cause the processor to categorize each application of the plurality of applications into one or more categories of a plurality of categories and perform the normalizing only within each category.

10. The system of claim 8, wherein, to normalize the relative power consumption values, the processor further normalizes the relative power consumption values over at least one of a defined time period and a plurality of users.

11. The system of claim 8, wherein the memory and the computer program code are configured to, with the processor, cause the processor to periodically perform the generation of the power consumption rating to generate an updated power consumption rating for at least one of the applications.

12. The system of claim 8, wherein the memory and the computer program code are configured to, with the processor, cause the processor to display the power consumption ratings to the user, wherein the user is one of a consumer or a software developer.

13. The system of claim 8, wherein, to calculate the relative power consumption value for each application, the processor further performs at least one of summing and averaging the obtained instrumentation data.

14. The system of claim 8, wherein the instrumentation data comprises at least one of telemetry data, network usage data, display usage data, disk activity data, and application usage data.

15. A computer storage device having computer-executable instructions that, upon execution by a processor, cause the processor to at least:

execute a plurality of applications on a device;

obtain instrumentation data related to power consumption by each application of the plurality of applications;

filter the obtained instrumentation data to acquire a subset of instrumentation data that is directly related to the power consumption or indirectly related to the power consumption;

calculate, based on the acquired subset of the obtained instrumentation data, a relative power consumption value for each application of the plurality of applications;

normalize the relative power consumption value for each application within an application category;

dynamically generate a power consumption rating for each application based on the normalization, while the device is executing the plurality of applications;

generate a dynamic label for each application corresponding to the dynamically generated power consumption rating;

present the dynamic label for each application of the plurality of applications to a user;

update the dynamic label when an application of the plurality of applications executing on the device is updated or when a threshold amount of new applications is executed on the device;

receive, from the user based on the updated dynamic label for the plurality of applications, a selection of an application of the plurality of applications representing an optimized application having a desired power consumption level; and execute the selected application of the plurality of applications on the device.

16. The computer storage device of claim 15, wherein the computer-executable instructions for generating the power consumption rating, upon execution by the processor, cause the processor to periodically perform the generation of the power consumption rating to generate an updated power consumption rating for at least one of the applications.

17. The computer storage device of claim 15, wherein the computer-executable instructions for generating the power consumption rating, upon execution by the processor, cause the processor to display the power consumption ratings to the user, wherein the user is one of a consumer or a software developer.

18. The computer storage device of claim 15, wherein calculating the relative power consumption value for each application comprises at least one of summing and averaging the obtained instrumentation data, and wherein the obtained instrumentation data comprises at least one of telemetry data, network usage data, display usage data, disk activity data, and application usage data.

19. The computerized method of claim 1, wherein filtering the obtained instrumentation data further comprises:

executing a data mining operation identifying the obtained instrumentation data.

20. The computerized method of claim 1, wherein the user is one of a consumer or a software developer.

\* \* \* \* \*